(12) United States Patent
Potyrailo et al.

(10) Patent No.: US 6,544,334 B1
(45) Date of Patent: Apr. 8, 2003

(54) SYSTEMS AND METHODS FOR THE DEPOSITION AND CURING OF COATING COMPOSITIONS

(75) Inventors: Radislav Alexandrovich Potyrailo, Niskayuna, NY (US); Daniel Robert Olson, Voorheesville, NY (US); Michael Jarvath Brennan, Burnt Hills, NY (US); Jay Raghunandan Akhave, Claremont, CA (US); Mark Anthony Licon, Diamond Bar, CA (US); Ali Reza Mehrabi, Los Angeles, CA (US); Dennis Lee Saunders, San Dimas, CA (US); Bret Ja Chisholm, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,832

(22) Filed: Oct. 23, 2001

(51) Int. Cl.⁷ ................................. B05C 9/14
(52) U.S. Cl. ......................... 118/58; 118/300
(58) Field of Search ................ 118/301, 504, 118/506, 505, 666, 624, 58, 59

(56) References Cited

U.S. PATENT DOCUMENTS

| | | | |
|---|---|---|---|
| 4,968,535 A | 11/1990 | Terai et al. | 427/358 |
| 5,075,139 A | 12/1991 | Crumbach et al. | 427/286 |
| 5,945,199 A | 8/1999 | Morin et al. | 428/156 |

(List continued on next page.)

OTHER PUBLICATIONS

*Organic Coatings*, Science & Technology, Second Edition by Wicks, Z.W. Jr.; Jones, F.N. and Pappas, S.P.; Wiley Interscience, 1999. pp 416–433.

*Surface Coatings*, vol. 2, Paints and Their Applications, prepared by the Oil and Colour Chemists' Association, Australia, Tafe Educational Books, 1987. pp. 718–747.

(List continued on next page.)

*Primary Examiner*—Richard Crispino
*Assistant Examiner*—George R. Koch, III
(74) *Attorney, Agent, or Firm*—Dougherty, Clements & Hofer; Christopher L. Bernard, Esq.

(57) ABSTRACT

Systems and methods for creating a combinatorial coating library including a coating system operatively coupled to at least one of a plurality of materials suitable for forming at least one coating layer on a surface of one or more substrates. The systems and methods also including a curing system operative to apply at least one of a plurality of curing environments to each of a plurality of regions associated with the at least one coating layer, the curing system comprising a plurality of waveguides each having a first end corresponding to at least one of the plurality of regions and a second end associated with at least one curing source. The combinatorial coating library comprising a predetermined combination of at least one of the plurality of materials and at least one of the plurality of curing environments associated with each of the plurality of regions.

11 Claims, 15 Drawing Sheets

U.S. PATENT DOCUMENTS

| | | | | |
|---|---|---|---|---|
| 5,985,356 | A | | 11/1999 | Schultz et al. .................. 427/8 |
| 6,004,617 | A | | 12/1999 | Schultz et al. .................. 427/8 |
| 6,034,775 | A | | 3/2000 | McFarland et al. ......... 356/364 |
| 6,045,671 | A | | 4/2000 | Wu et al. .............. 204/298.11 |
| 6,113,695 | A | * | 9/2000 | Fujimoto ..................... 118/313 |
| 6,151,123 | A | | 11/2000 | Nielsen ....................... 356/445 |
| 6,482,264 | B1 | * | 11/2002 | Sun .............................. 118/58 |

OTHER PUBLICATIONS

*Coating Technology Handbook,* edited by Satas, D.; Marcel Dekker, Inc., 1991. pp. 129–155, 179–191, 254–261.

*Acoustic Wave Sensors: Theory, Design, and Physico Chemical Application,* Ballantine, D.S., Jr.; White, R.M.; Martin, S.J.; Ricco, A.J.; Frye, G.C.; Zetters, E.T.; Wohltjen, H.; Academic Press: SanDiego, CA 1997 pp 150–221.

*Modern Optical Engineering,* Smith, W.J., McGraw–Hill: New York, NY, 1990. pp205–211.

*A Chemically Diverse Conducting Polymer Based "Electronic Nose",* Freud, M.S.; Lewis, N.S.; Natl. Acad. Sci. USA 1995, 92,2652–2656.

*Generating Sensor Diversity Through Combinatorial PolymerSynthesis,* Dickinson, T.A.; Walt, D.R.; White, J.; Kauer, J.S.; Anal. Chem. 1997, 69,3413–3418.

Lewis J. Rothberg and Andrew J. Lovinger, "Status of and Prospects for Organic Electroluminescence," *Journal of Materials Research,* vol. II, No. 12, pp. 3174–3187, Dec. 1996.

X.D. Xiang, Xiaodong Sun, Gabriel Briceno, Yulin Lou, Kai–An Wang, Hauyee Chang, William G. Wallace–Freedman, Sun–Wei Chen, Peter G. Schultz; "A Combinatorial Approach to Materials Discovery," *Science,* vol. 268, Jun. 23, 1995.

J.J. Hanak; *Journal of Materials Science 5* (1970) 964–971; "The 'Multiple–Sample Concept' in Materials Research: Synthesis, Compositional Analysis and Testing of Entire Multicomponent Systems".

R.B. van Dover, L.F. Schneemeyer, R.M. Fleming; *Nature,* vol. 392, Mar. 12, 1998; "Discovery of a useful thin–film dielectric using a composition–spread approach".

* cited by examiner

SYSTEMS AND METHODS FOR THE DEPOSITION AND CURING OF COATING COMPOSITIONS

FEDERAL RESEARCH STATEMENT

The U.S. Government may have certain rights in this invention pursuant to National Institutes of Standards and Technology (NIST) contract number 70NANB9H3038.

BACKGROUND OF INVENTION

The present invention relates generally to systems and methods for generating combinatorial coating libraries and, more specifically, to systems and methods for depositing and curing substrate-supported chemical compositions.

Coatings are widely used in industry to enhance the functionality and add-on value of bulk materials. There are generally two types of functional coating materials: organic and inorganic coatings. Organic coating materials are widely used in industrial protective/decorative applications, such as automobile clear coatings, paints, etc. Other types of organic coatings include, for example, environmental barrier coatings, anticorrosive coatings, adhesive and release coatings, electric conductive/optic transparent coatings, scratch-resistant coatings, etc. The discovery of an advanced coating formulation promises significant value for a manufacturer.

The development of generic tools to accelerate the discovery process for various coating systems may be of even higher value for a manufacturer, however, as the search for and optimization of advanced coatings is more of an art than a science. The power of theoretical guidance in the search for and optimization of advanced coatings is limited, largely because of the complexity of a typical coating system and the multiplicity of quality requirements that must be met. Typically, industrial coating formulations must meet multiple functional requirements, and multiple compatible functional groups or blends are necessary to obtain a balanced formulation. In addition, the properties of a coating system depend not only on the formula/composition, but also on the coating application method and processing conditions. For example, the degree of thickness uniformity and surface roughness, which depend on the application method and processing conditions of a coating, are important in the quality and reproducibility of the coating. Further, different application methods and processing conditions, including, for example, the sequence of application of each layer of a multi-layer coating, exposure to ultraviolet (UV)/electron curing, and varying temperature/pressure, are highly important factors in determining the structure/composition of the final coating, impacting its functionality;

Thus, because of the multitude of variables that affect the production of a coating, most of the usable industrial coating systems developed to date have been the result of serendipitous trial-and-error experimental processes.

SUMMARY OF INVENTION

Therefore, there is a need for systems and methods that accelerate the rate at which functional coatings may be generated for various manufacturing applications. Further, there is a need for systems and methods that allow such coatings to be produced in a controlled manner, with variable compositions/thicknesses and curing parameters over the different regions of a single coating or a coating library.

In one embodiment, a system for creating a combinatorial coating library includes a coating system operatively coupled to at least one of a plurality of materials suitable for forming at least one coating layer on a surface of one or more substrates. The system also includes a curing system operative to apply at least one of a plurality of curing environments to each of a plurality of regions associated with the at least one coating layer, the curing system comprising a plurality of waveguides or tubes each having a first end corresponding to at least one of the plurality of regions and a second end associated with at least one curing source. The combinatorial coating library comprises a predetermined combination of at least one of the plurality of materials and at least one of the plurality of curing environments associated with each of the plurality of regions.

In another embodiment, a method for creating a combinatorial coating library includes selectively applying at least one of a plurality of materials suitable for forming at least one coating layer to a surface of one or more substrates. The method also includes selectively applying at least one of a plurality of curing environments to each of a plurality of regions associated with the at least one coating layer using a curing system comprising a plurality of waveguides or tubes each having a first end corresponding to at least one of the plurality of regions and a second end associated with at least one curing source. The combinatorial coating library comprises a predetermined combination of at least one of the plurality of materials and at least one of the plurality of curing environments associated with each of the plurality of regions.

DETAILED DESCRIPTION

Figure 1:
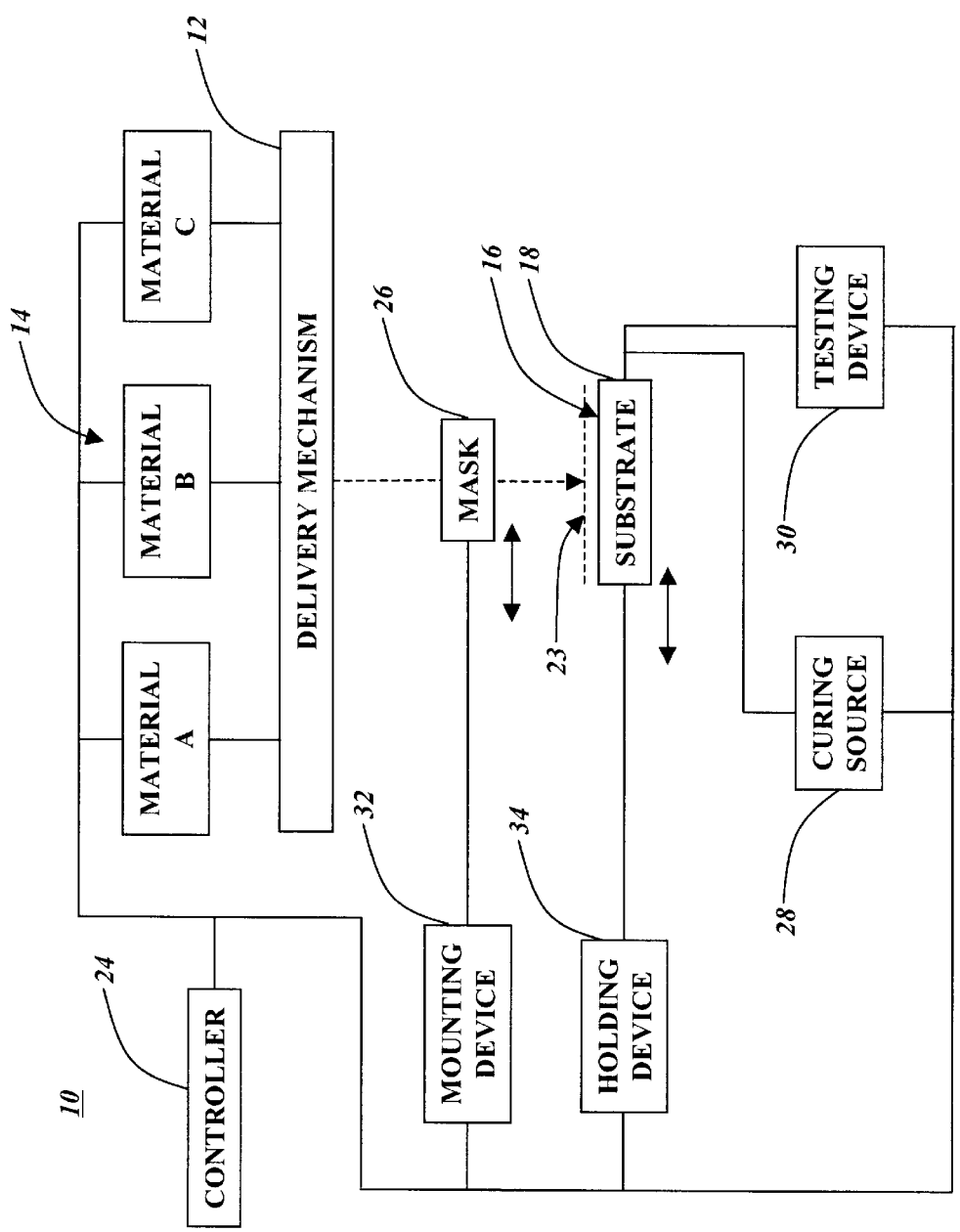
FIG. 1 is a schematic diagram of a system for the deposition and curing of coating compositions.
Figure 2:
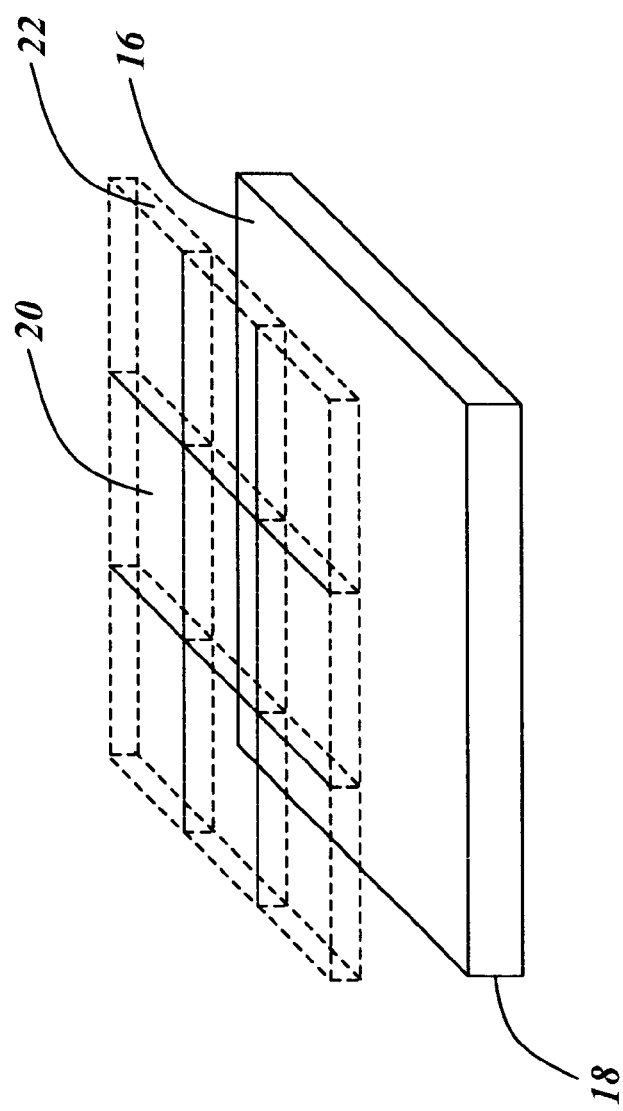
FIG. 2 is perspective view of a coating library generated by the system of FIG. 1.

Referring to FIGS. 1 and 2, a system 10 for making an array of coated materials that form a coating library 11 includes a delivery mechanism 12 for delivering a plurality of materials 14 onto a surface 16 of a substrate 18 to form a coating 20. The substrate surface 16 includes a plurality of predefined regions 22 that are positioned within a delivery area 23. The delivery mechanism 12 is positioned to deliver the plurality of materials 14 to the delivery area 23. Optionally, a mixer combines the plurality of materials 14 to form a mixture or combination of the plurality of materials 14, with a controller 24 controlling the selection, quantity, and sequence of delivery of each of the plurality of materials 14 to the mixer such that the composition of the coating 20 may be varied, either incrementally or continuously, between each of the plurality of predefined regions 22 of the substrate surface 16 to form a coating library 11. As such, each of the plurality of predefined regions 22 is coated with one of a plurality of predefined coatings. The plurality of predefined coatings may include a single layer coating of one of the plurality of materials 14 and a single layer coating of a combination of the plurality of materials 14. Optionally, the plurality of predefined coatings may also include a multi-layer coating, where each layer is one of the plurality of materials 14, and a multi-layer coating, where each layer is a combination of the plurality of materials 14. Additionally, the system 10 may include a mask 26 in communication with the controller 24 to permit the delivery of the plurality of materials 14 to different combinations of the plurality of predefined regions 22 of the substrate surface 16. The system 10 may also include a curing source 28 for curing the plurality of materials 14, or combinations thereof, either as they are being delivered onto the substrate surface 16 or once they have been deposited on the substrate 18. Further, the system 10 may include a testing device 30 for performing analytical tests on the coated substrate 18 or coating library 11 to determine the properties or characteristics of each of the plurality of predefined coatings. The mask 26 may be secured by a mounting device 32, which optionally may movably position the mask 26 within the system 10. Similarly, the substrate 18 may be secured by a holding device 34, which preferably movably positions the substrate 18 within the system 10. Thus, the present invention provides a system 10 and method for manufacturing a coating library 11 having an array of coatings 20 established from a plurality of materials 14 delivered onto a substrate 18. Specific embodiments of this system 10 and method are discussed below.

The delivery mechanism 12 may be a single device or it may be a plurality of individual devices, each delivering the plurality of materials 14 onto the surface 16 of the substrate 18. The position of the delivery mechanism 12 may be fixed within the system 10 relative to the delivery area 23 or it may be movable relative to the delivery area 23. Preferably, the delivery mechanism 12 projects the plurality of materials 14 to the delivery area 23 in a vaporized/atomized or liquid form. Suitable examples of a delivery mechanism 12 include: a spray nozzle or gun of any type, such as an air, airless, thermal, ultrasonic, or hydraulic force spray nozzle or gun; a die/scraper casting head; an electron-beam evaporator; a sputtering device; a chemical vapor deposition device; an ink jet print head; a draw-down device, such as a wire-wound rod or a doctor-blade; and a linear coating head. The linear coating head may, for example, include one or more coating applicators, each having a supply inlet fluidly coupled to at least one of the plurality of materials 14 and each defining an elongate distribution channel with a length corresponding to a width of the substrate 18. The linear coating head is preferably positioned at a suitable distance adjacent to the surface 16 of the substrate 18 to dispense a uniform thickness of the plurality of materials 14, or a combination(s) thereof, onto the substrate 18.

Figure 3:
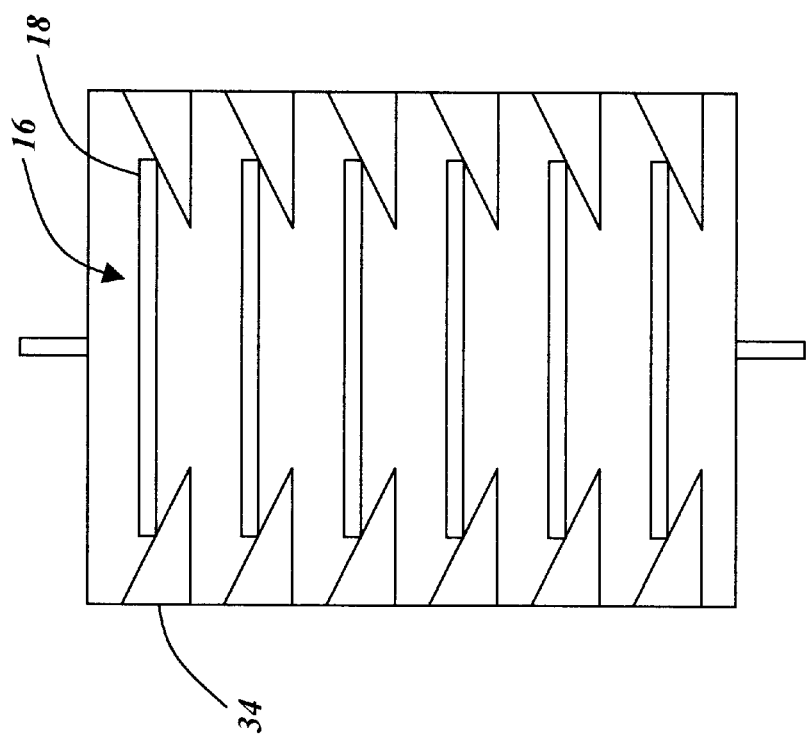
FIG. 3 is a cross-sectional side view of one embodiment of the system of FIG. 1, utilizing a one-dimensional spin-coating method.
Figure 4:
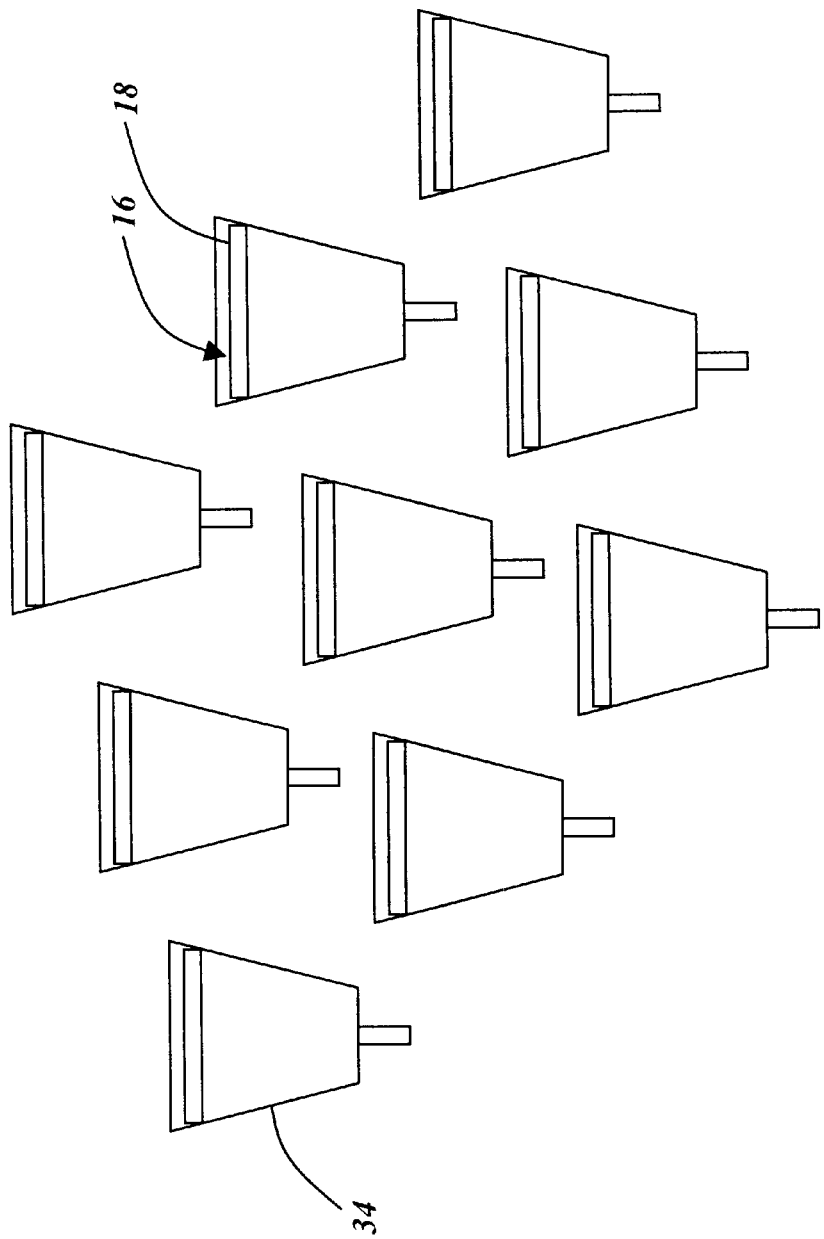
FIG. 4 is a cross-sectional side view of another embodiment of the system of FIG. 1, utilizing a two-dimensional spin-coating method.

In one embodiment, the delivery mechanism 12 may also include a plurality of conventional liquid-handling devices (such as the Quadra 96 Model 230 Liquid Delivery System, Tomtec, Orange, Conn.). The liquid-handling devices, placed at predetermined positions adjacent to the surface 16 of one or more spinning substrates 18, deliver the plurality of materials 14, or combinations thereof, to the substrate(s) 18. The spinning substrate(s) 18, and the associated holding device 34 may be arranged in, for example, a one-dimensional array (see FIG. 3) or a two-dimensional array (see FIG. 4).

Figure 5:
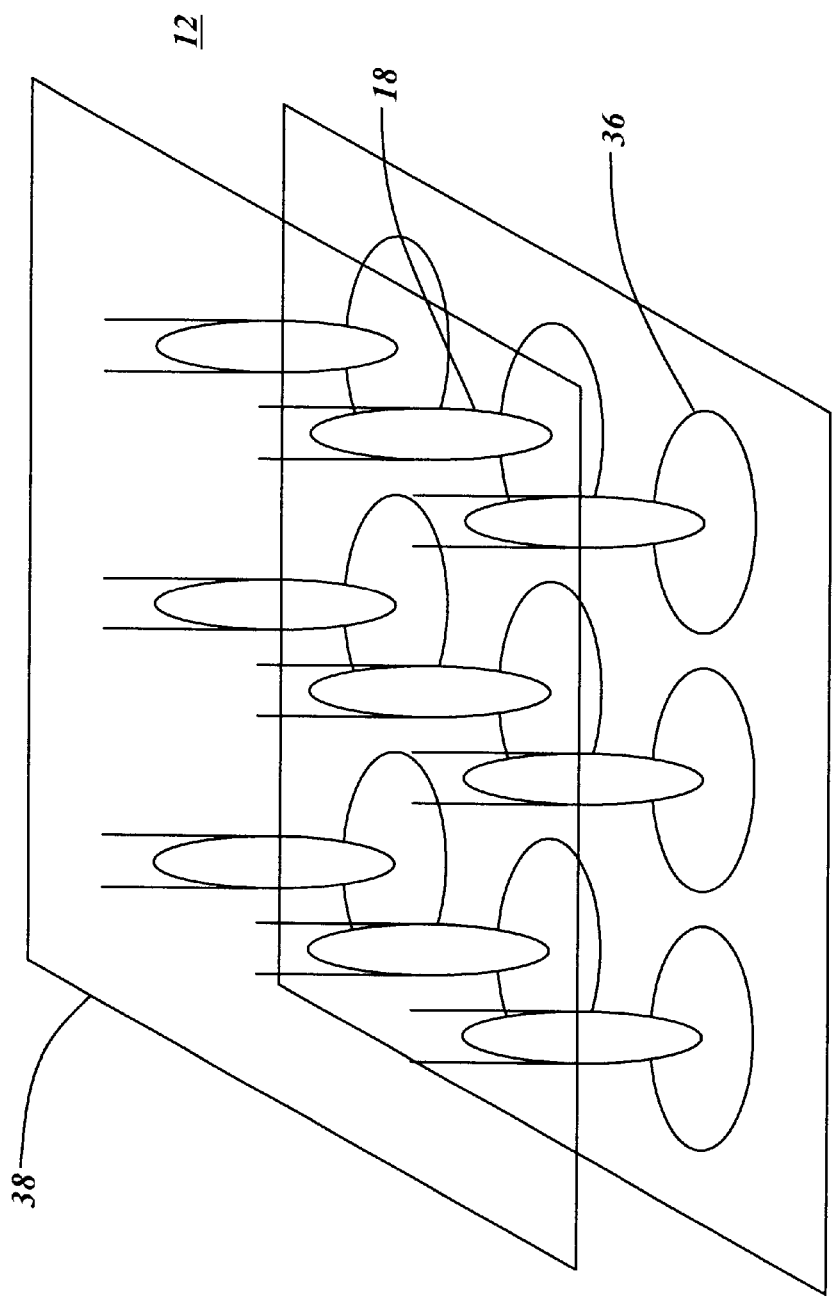
FIG. 5 is a perspective view of a further embodiment of the system of FIG. 1, utilizing a dip-coating method.

Alternatively, referring to FIG. 5, in another embodiment the delivery mechanism 12 may include a plurality of wells 36 or other suitable containers in which the plurality of materials 14, or combinations thereof, may be disposed. Liquids of the same or different compositions may be disposed within the plurality of wells 36 using, for example, a conventional liquid-handling device. A plurality of substrates 18, each held by a substrate holder, are arranged vertically and immersed in the corresponding wells 36. Upon removal of the substrate array 38, each of the plurality of substrates 18 is dip-coated with a predetermined coating. This method is particularly useful for the coating of acoustic wave transducers used to measure variations in acoustic wave parameters as the amount of material deposited on each device or the viscoelastic properties of each coating vary. Each of the plurality of acoustic wave transducers may have a first acoustic wave parameter and a second acoustic wave parameter, the first acoustic wave parameter corresponding to a first amount of coating or viscoelastic property of the coating layer, the second acoustic wave parameter corresponding to a second amount of coating or viscoelastic property of the coating layer.

Referring again to FIGS. 1 and 2, the plurality of materials 14 may include organic materials in various states, such as vaporized/atomized and liquid materials. Suitable examples of said materials 14 include polymeric materials, oligomeric materials, and small molecules, where the small molecules may be individual monomers that react to form a coating. The plurality of materials 14 may include, but are not limited to, polymers and oligomeric materials such as polycarbonates, acrylics, silicones, cellulose esters, polyesters, alkyds, polyurethanes, polyethers, vinyl polymers, and the like, as well as monomers including acrylates, epoxies, polyisocyanates, polyols, thiols, unsaturated esters, silanes, substituted olefins, and the like. Preferably, the plurality of materials 14 provide organic polymeric materials, such as "architectural" materials having protective or decorative functionality, especially including thermoplastic or thermosetting polymers. Further, the plurality of materials 14 optionally may be vaporized or atomized, individually or in combination, and directed to or deposited onto the substrate 18, with the vaporized/atomized material coalescing to form a continuous coating 20 if a sufficient amount of the material is delivered onto the substrate 18. Alternatively, the plurality of materials 14 may be directed to or deposited onto the substrate 18 in a liquid form. Optionally, the material or combination of materials 14 may form a coating 20 having a plurality of layers, where the coating 20 may be a multi-functional coating having an overall function dictated by a predefined functional role of each layer. The plurality of materials 14 may be combined such that multiple organic materials are combined into a coating 20. By providing these various combinations of the plurality of materials 14, the interaction and compatibility of various combinations may be determined through the use of the testing device 30. The coating 20 is a material or a combination of materials deposited on the surface 16 of the substrate 18. These materials 14 may remain as separate homogenous materials, or they may interact, react, diffuse, mix, or otherwise combine to form a new homogeneous material, a mixture, a composite, or a blend. In general, a coating 20 has a lateral measure, i.e. a measured length across the surface 16 of the substrate 18, much greater than a thickness, i.e. a measure of the coating 20 normal to the surface 16 of the substrate 18. Preferably, each layer of coating 20 is a thin-film layer. The coating 20 may vary in composition, preferably in an incremental or continuous manner, from one predefined region 22 to another to thereby form an array of coatings that define the plurality of predefined coatings of the coating library 11. Each member of the array of coatings is distinguishable from the others based upon its location. Further, each member of the array of coatings may be processed under the same conditions and analyzed to determine its performance relative to functional or useful properties, and then compared with each of the other members of the array of coatings to determine its relative utility. Alternatively, each member of the array of coatings may be processed under different conditions and the processing methods may be analyzed to determine their performance relative to functional or useful properties, and then compared with each other to determine their relative utility.

Each of the plurality of predefined regions 22 is a fixed area on the surface 16 of the substrate 18 for receiving one or a combination of the plurality of materials 14 to form a coating 20. Each of the predefined regions 22 may have any shape sufficient for receiving and analyzing the coating 20 deposited thereon, such as rectangular, linear, arcuate, circular, elliptical, combinations thereof, etc. Each of the predefined regions 22 typically has an area in the range of about 0.01 mm$^2$ to about 100 cm$^2$, preferably in the range of about 1 mm$^2$ to about 10 cm$^2$, and more preferably in the range of about 10 mm$^2$ to about 100 mm$^2$. Other areas may be utilized, and the area of each predefined region 22 may be determined by the capability of the deposition and analytical devices, or by a preferred density of the coating library 11, etc. The substrate 18 is a rigid or semi-rigid material suitable for receiving and supporting the plurality of materials 14. The substrate 18 has at least one substantially flat surface 16, or surface otherwise capable of receiving the plurality of materials 14, which includes the plurality of predefined regions 22. This surface 16, optionally, may have raised portions to physically separate each of the plurality of predefined regions 22. The substrate 18 may be of any size and shape, but preferably is in an elongated shape, such as in a tape, film, web, or roll. A film, for example, may range in thickness from about 25 micrometers to about 1,250 micrometers. The substrate 18 may also be in a disk, plate, or spherical shape. The surface 16 of the substrate 18, corresponding to the delivery area 23, typically has an area in the range of about 1 mm$^2$ to about 1 m$^2$, preferably in the range of about 50 mm$^2$ to about 750 cm$^2$, and more preferably in the range of about 1 cm$^2$ to about 500 cm$^2$. The substrate 18 may be secured within the system 10 and positioned in the delivery area 23 by the holding device 34. The holding device 34 may movably position the substrate 18 within the system 10. Preferably, the holding device 34 may movably position the substrate 18 at a substantially constant rate. For example, for a substrate 18 in the form of an elongated tape, web, or roll, the holding device 34 may include a tape pay-out device and a tape take-up device that are both rotatable and which support the tape, possibly in combination with rollers, in the delivery area 23. In another example, the holding device 34 may be a stage on which the substrate 18 is placed and secured, where the stage is connected to a motor or other actuator-type device that controls the position and movement of the stage relative to the delivery area 23. As such, the controller 24 may control the movement of the holding device 34 to determine which of the plurality of predefined regions 22 of the surface 16 of the substrate 18 receive the plurality of materials 14. For example, the controller 24 may move the holding device 34 such that predetermined ones of the plurality of predefined regions 22 are outside of the delivery area 23 and therefore do not receive the plurality of materials 14.

The delivery area 23 is an area at a fixed position within the system 10. The delivery area 23 may be of any shape and size and typically, but not necessarily, substantially corresponds in shape and size to the plurality of predefined regions 22 of the surface 16 of the substrate 18. However, the plurality of predefined regions 22 of the surface 16 of the substrate 18 may be much larger or much smaller than the delivery area 23. The fixed positioning of the delivery area 23 provides a known, constant locale for the system 10 to deliver the plurality of materials 14 onto the surface 16 of the substrate 18.

The controller 24 is a computer system having inputs, outputs, a memory, and a processor for receiving, sending, storing, and processing signals and data to operate, monitor, record, and otherwise functionally control the operation of the system 10. The controller 24 includes a computer system having an interface board for integrating all of the components of the system 10 and a motion controller for controlling the movements of the mask 26 and substrate 18. The controller 24 may include a keyboard and a mouse for inputting data and commands, a video display for displaying information, and a printer for printing information. The controller 24 may include software, hardware, firmware, and other similar components and circuitry for operating the system 10. The controller 24 may be a single device, or it may be a plurality of devices working in concert. The controller 24 is preferably in communication with all of the other components of the system 10, including the plurality of materials 14, the delivery mechanism 12, the substrate 18, the mask 26, the curing source 28, the testing device 30, the mounting device 32, and the holding device 34, to coordinate the operations of the system 10. For example, the controller 24 may control the selection, quantity, and sequence of delivery of each of the plurality of materials 14 to a mixer such that the composition of the coating 20 may be varied, either incrementally or continuously, between each of the plurality of predefined regions 22 of the substrate surface 16. The controller 24 may also control the delivery of the plurality of materials 14 onto the substrate 18, recording the exact combination of materials 14 that make up the coating 20 at each predefined region 22. By controlling the delivery, the controller 24 may control one or more of the material volume, the combination of materials 14, the projective power, the coating speed, the spacing between the delivery mechanism 12 and the substrate 18, the masking, etc. Further, the controller 24 controls, synchronizes, combines, and records the delivery and curing of the delivered materials 14, the testing of the coating library 11, and the analysis of the test results. The mask 26 is a material having one or more patterns of open areas and blocked areas, where the open areas allow delivery of the plurality of materials 14 and/or a curing medium onto the substrate 18 and the blocked areas prohibit the delivery. The pattern may be in any shape. The mask 26 is utilized to define the spatial variation of materials or processing conditions in the coating library. In a binary masking system, for example, the mask 26 includes a plurality of patterns that are sequentially arranged to allow delivery to alternating half areas on the surface 16 of the substrate 18. The mask 26 may be positioned anywhere in between the plurality of materials 14 and/or curing source 28 and the substrate 18, including positioned directly on top of and in contact with the substrate 18, along the line of delivery of the materials 14 or curing medium. By increasing the spacing between the mask 26 and the substrate 18, an effect called "shadowing" is produced which may be undesirable in some instances. In shadowing, the pattern of material 14 delivered to the substrate 18 is proportional to the pattern of the mask 26, but larger, as the spacing between the mask 26 and the substrate 18 allows the delivered pattern to expand until it reaches the substrate 18. The mask 26 may be formed of a rigid or semi-rigid material, or the mask 26 may be a chemical formed on the surface 16 of the substrate 18. Preferably, the material of the mask 26 insures that the mask 26 is as flat as possible and resists bending and/or folding. Suitable examples of mask materials include: silicon, silicon oxide, and glass for rigid or relatively non-bendable materials; plastics, metals, and alloys for semi-rigid or relatively bendable materials in the form of sheets, films, or foils; and lithographic-polyacrylate ("PMMA") and other chemical materials that form positive and negative chemical masks.

The mask 26 may be secured within the system 10 and positioned relative to the delivery area 23 by the mounting device 32. The mounting device 32 may movably position the mask 26. For example, for a mask 26 in the form of an elongated semi-rigid material having a plurality of patterns, the mounting device 32 may include a tape pay-out device and a tape take-up device that are both rotatable and that support the tape, possibly in combination with rollers, relative to the delivery area 23. In another example, for a mask 26 in the form of a rigid material, the mounting device 32 may be a platform or other supporting structure connected to a motor or other actuator-type device that controls the position of the platform and mask 26 relative to the delivery area 23. This allows one pattern or a number of patterns to be utilized to mask different predefined regions 22 of the substrate 18 by movement of the mask 26. As such, the controller 24 may control the movement of the mounting device 32 to control the predefined regions 22 onto which the plurality of materials 14, or combinations thereof, are delivered.

The curing source 28 is a device in communication with each of the plurality of materials 14 causing a reaction or solvent evaporation with one or a combination of the plurality of materials 14. For example, the reaction may be a polymerization reaction, a cross-linking reaction, a small molecule reaction, an inorganic phase reaction, and other similar reactions appropriate for the delivered material(s) 14. The curing source 28 accomplishes this by delivering a curing medium. The curing medium may be any form of energy or suitable material that interacts with the combination of the plurality of materials 14 forming the coating 20 to sufficiently cure the coating 20. Suitable examples of curing environments preferably include those created by a curing source 28 selected from the group consisting of ultraviolet (UV) radiation, infrared (IR) radiation, thermal radiation, microwave radiation, visible radiation, narrow-wavelength radiation, laser light, and humidity. Suitable examples of a curing source 28 include, for example, a heating device in communication with the substrate 18, a radiation device in communication with the delivered or deposited materials 14, a microwave device, a plasma device, and combinations thereof. It may be desirable, for example, to combine radiative thermal energy with UV radiation or IR radiation to cure coatings 20 forming a coating library 11.

The curing source 28 may be placed in communication with each of the plurality of materials 14 such that it causes the same reaction, or degree of reaction, in each of the predefined coatings in each of the plurality of predefined regions 22 or it may be placed such that it causes a different reaction, or degree of reaction, in each of the predefined coatings in each of the plurality of predefined regions 22. In practice, this may be done, for example, by positioning the curing source 28 such that the plurality of materials 14 or predefined coatings in each of the plurality of predefined regions 22 are exposed to heat or radiation with, for example, a linearly varying intensity across the lateral direction, or width, of the substrate 18.

The dose of the curing medium received by a particular coating composition is important because the amount of curing of a coating 20 may affect such coating characteristics as the physical, mechanical, chemical, morphological, optical, electrical, and biological performance characteristics of the coating 20. The amount of curing may also affect the characteristics of a coating 20 with respect to the substrate 18, such as the adhesion performance characteristics of the coating 20. Coating characteristics affected by curing also include abrasion resistance, corrosion resistance, solvent resistance, translucence, haze, gloss, permeability, etc.

Figure 6:
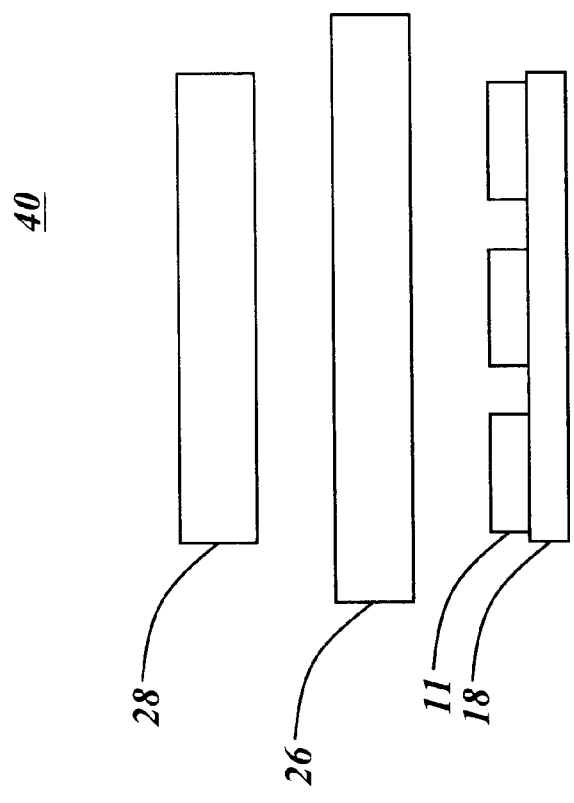
FIG. 6 is cross-sectional side view of a spatially-addressable mask system.
Figure 6:
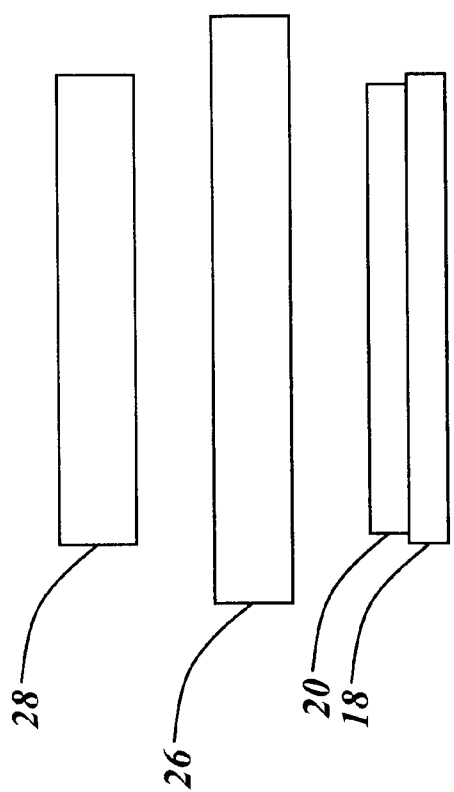

Referring to FIG. 6, one embodiment of a curing system incorporating a curing source 28 includes a spatially-addressable mask system 40. The mask system 40 includes a curing source 28 spaced apart from a moving or stationary substrate 18 with a single coating 20 or a continuous or discrete coating library 11 deposited on its surface 16. The curing source 28 is positioned to face the coated surface 16 of the substrate 18. A spatial mask 26 is positioned between the curing source 28 and the coating 20 or coating library 11 such that the curing medium passes through the spatial mask 26 prior to being received by the coating 20 or coating library 11. The spatial mask 26 preferably has an elongated surface having at least a length and a width, the transmission of the curing medium through the spatial mask 26 varying across the surface of the spatial mask 26. The curing medium may be, for example, thermal, UV, visible, microwave, electron beam, laser radiation, or humidity. As such, the variable transmission characteristic of the spatial mask 26 acts to filter the dose of the curing medium across the coating 20 or coating library 11, thereby providing variable, predetermined curing doses at each of the plurality of predefined regions 22, enabling spatially-addressable curing. The performance characteristics of each of the plurality of coatings 20 of the coating library 11 may then be screened and analyzed to determine the desired amount or dose of a given curing medium associated with a desired level of a given performance characteristic.

The spatial mask 26 may include any material, component, or combination of materials or components that allow for the variable transmission of the curing medium across the coating library 11 along one or more spatial coordinates. Suitable examples of a spatial mask 26 include: a variable thickness wedge of quartz or glass; quartz or glass variably doped across its area with a material having lower transmissibility characteristics; a printed image on a slide or other optically transparent material; combinations thereof; and other suitable materials that variably attenuate a given curing medium within a spectral range of interest.

Figure 7:
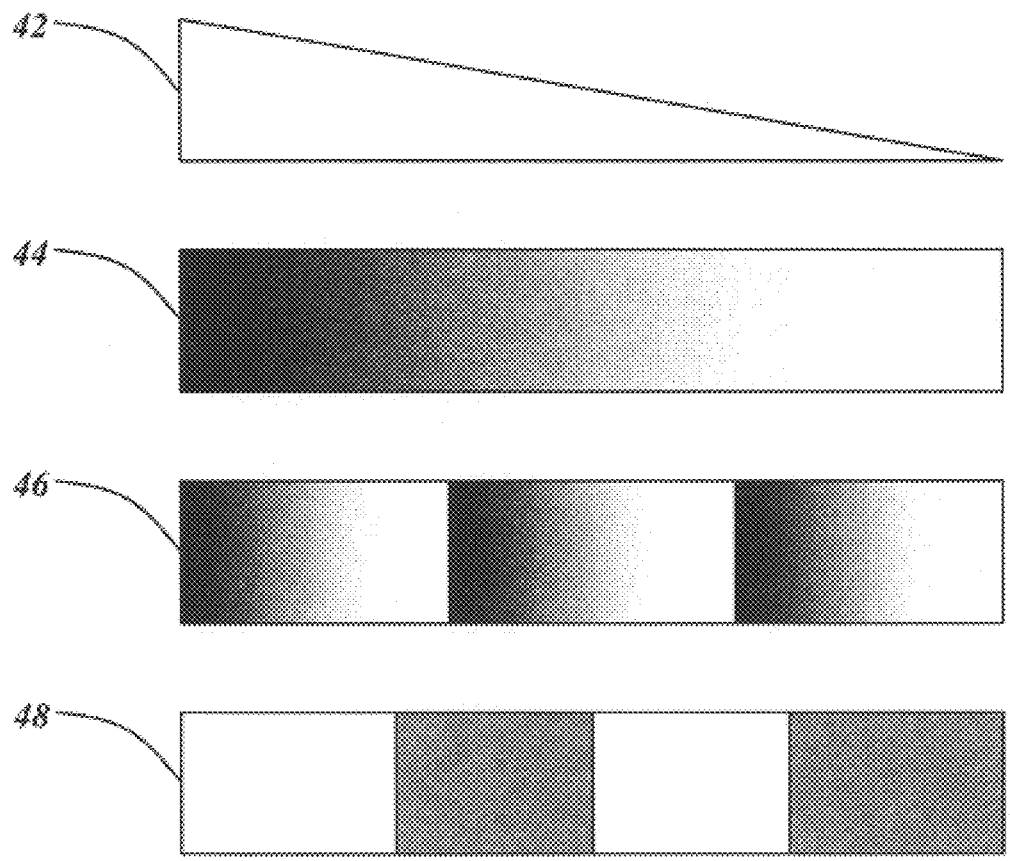
FIG. 7 is a graphic representation of a wedge mask, a linearly-variable mask, a sinusoidally-variable mask, and a repeating mask.
Figure 8:
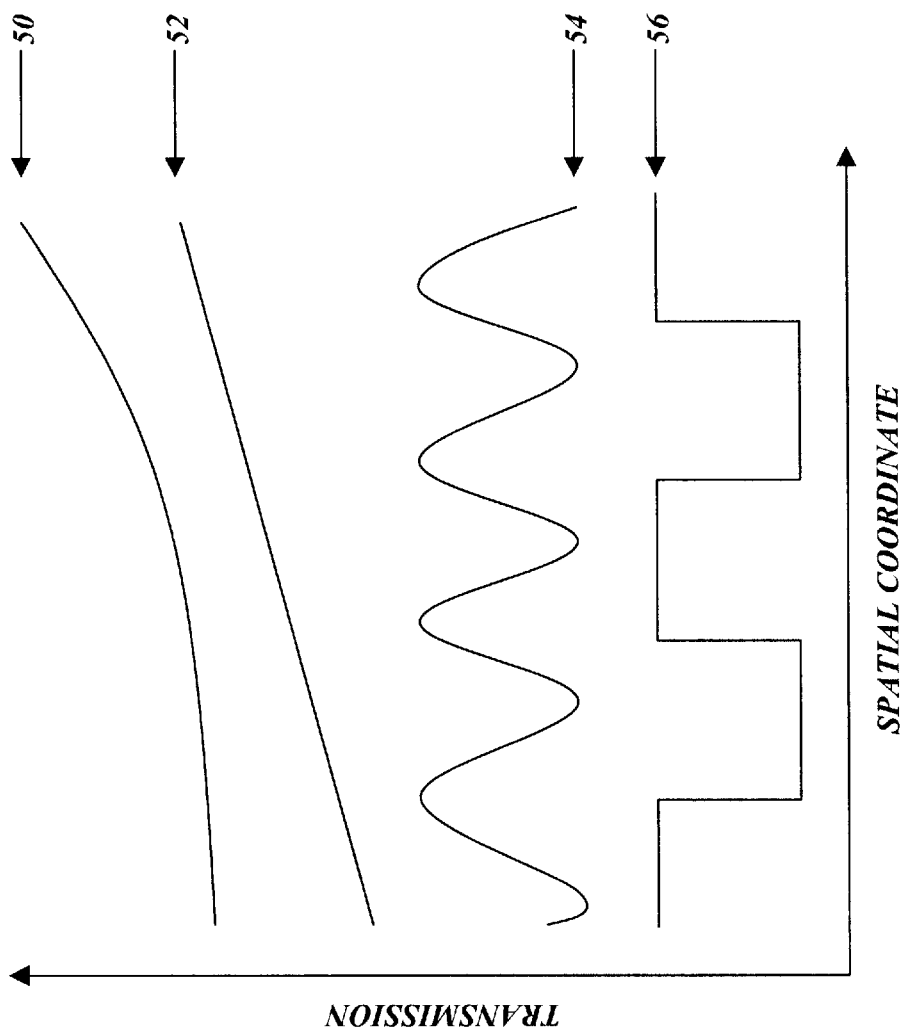
FIG. 8 is a plot of the transmission characteristics of the mask of FIG. 7.

For example, referring to FIGS. 7 and 8, the spatial mask 26 may include a wedge mask 42, a linearly-variable mask 44, a sinusoidally-variable mask 46, and a repeating mask 48. Referring to FIG. 7, the wedge mask 42 may include a quartz, borosilicate, or glass material having a variable thickness along a spatial coordinate, such as length or width. Referring to FIG. 8, the variable thickness of the wedge mask 42 serves as an exponential alternator of the curing medium, providing a transmission characteristic 50 that exponentially varies along the spatial coordinate.

Referring again to FIG. 7, the linearly-variable mask 44 includes a slide or optically transmissive material having a linearly varying pattern, such as ink or toner, deposited on one surface. Referring to FIG. 8, a linearly varying transmission characteristic 52 results from the attraction of the curing medium by the material pattern.

Referring again to FIG. 7, the sinusoidally-variable mask 46 is similar to the linearly-variable mask 44, but with a sinusoidally varying material pattern. Referring to FIG. 8, a sinusoidally varying transmission characteristic 54 thereby results.

Referring again to FIG. 7, the repeating mask 48 includes a material pattern that varies in a step-wise fashion. Referring to FIG. 8, a step transmission characteristic 56 thereby results.

Although FIGS. 7 and 8 include longitudinally varying thicknesses or material patterns corresponding to transmission characteristics that vary along an associated longitudinal spatial coordinate, it is to be understood that variations may also occur laterally or along any other one or combinations of spatial coordinates.

In addition to providing variable curing across one or more spatial coordinates or dimensions, the use of a spatial mask 26 provides a controllable predetermined variation of the curing medium dosage across a coating library 11. Further, the spatial mask 26 occupies only a small amount of physical space, making more efficient use of a given space and allowing for the use of bulkier curing sources 28. Further, the spatial mask 26 may include polarization or filtering characteristics to channel the curing medium onto the coating library 11 so as to insure that a desired transmission characteristic is achieved for a given region of the coating library 11.

Figure 9:
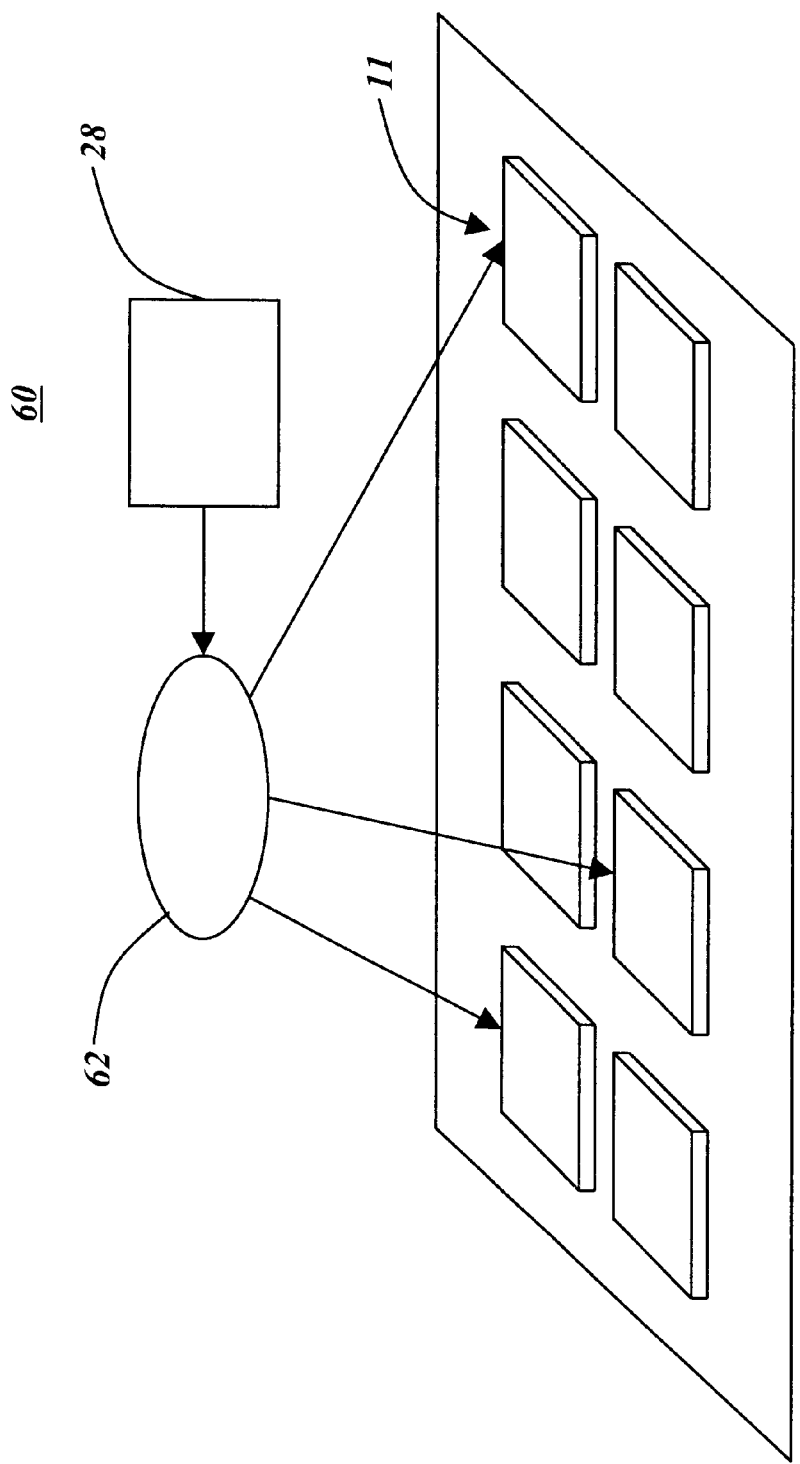
FIG. 9 is a perspective view of a scanning mirror system.

Referring to FIG. 9, another embodiment of a spatially-addressable curing system incorporating a curing source 28 includes a scanning mirror system 60. The scanning mirror system 60 includes a curing source 28, such as a laser, that directs the curing medium to one or more scanning mirrors 62, which re-direct the curing medium to one or more predetermined regions of the coating library 11. The use of a narrow-wavelength curing source, such as a laser or similar radiation source, may provide high power over certain spectral ranges, power that may be unavailable using broad-band sources. Suitable scanning mirrors 62 include, but are not limited to, those scanning projectors utilized in, for example, laser shows (CATWEAZLE Pro, CATWEAZLE VX, and KillerCat available from MediaLas Laserproducts GmbH, Hechingen, Germany), industrial applications (model GS300s available from Laser and Motion Development Company, Union City, Calif.; X-Y scanner/3-dimensional profiler of concave surfaces and glass thickness meter available from Light Conversion Ltd., Vilnius, Lithuania), and research scanning systems (Institute for Computer Base Learning, Heriot-Watt University, Edinburgh EH14 4AS, UK). Suitable curing sources 28 include, but are not limited to, UV Lamp System Model EPIC 6000 from Fusion UV Systems, Inc., Gaithersburg, Md.; Pulsed UV Curing System Model RC-5000 from Xenon Corporation, Woburn, Mass.; UV-Visible Spot Cure System Model Novacure from EFOS, Mississauga, ON, CAN; and Spot Curing Source Model Flexicure from Macam Photometrics Ltd., Livingston Scotland. Optionally, the scanning mirror system 60 may be in communication with the controller 24 for controlling the timing and intensity of the curing medium delivered by the curing source 28 and for controlling the position/attitude of the scanning mirrors 62.

Figure 10:
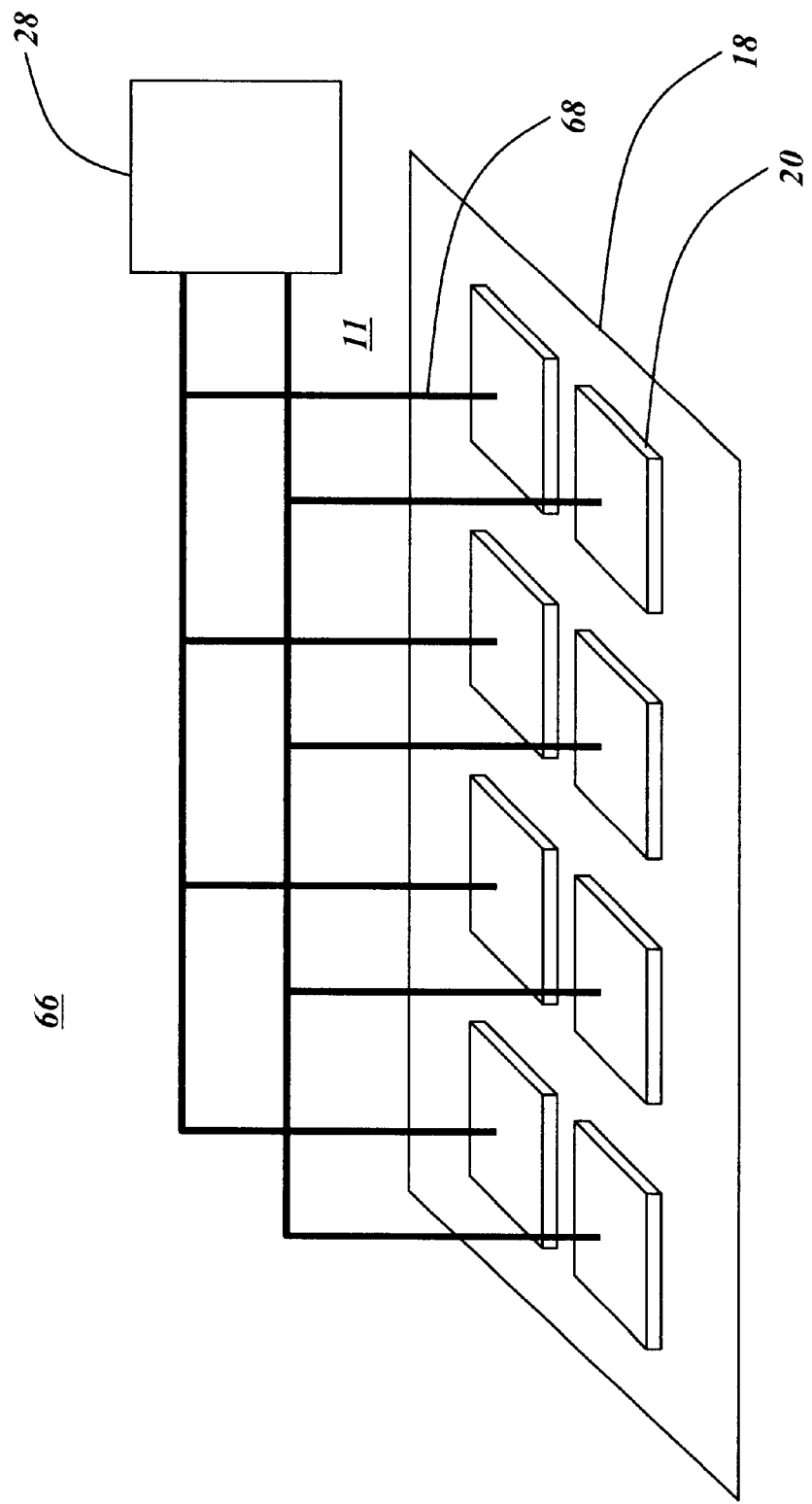
FIG. 10 is a perspective view of guided spatially-addressable curing system.

Referring to FIG. 10, a further embodiment of a curing system incorporating a curing source 28 is a guided spatially-addressable curing system 66. The guided system 66 includes a curing source 28, such as a UV source, an IR source, a thermal source, a microwave source, or a humidity source, which provides a curing medium that is directed to individual spatial locations of the coated substrate 18 via dielectric or metal waveguides or tubes 68. Preferably, the plurality of waveguides or tubes 68 each have a first end corresponding to one of the plurality of regions associated with the coated substrate 18 and a second end associated with the curing source 28. For example, UV radiation may be directed to the coated substrate 18 using quartz or liquid-core waveguides. IR radiation may be directed to the coated substrate 18 using IR optical fibers. Hollow metal waveguides or tubes may be used to direct thermal radiation, microwave radiation, or humidity to the coated substrate 18. The guided system 66 allows different regions of the coating 20 or coating library 11 to be cured using different curing techniques.

Figure 11:
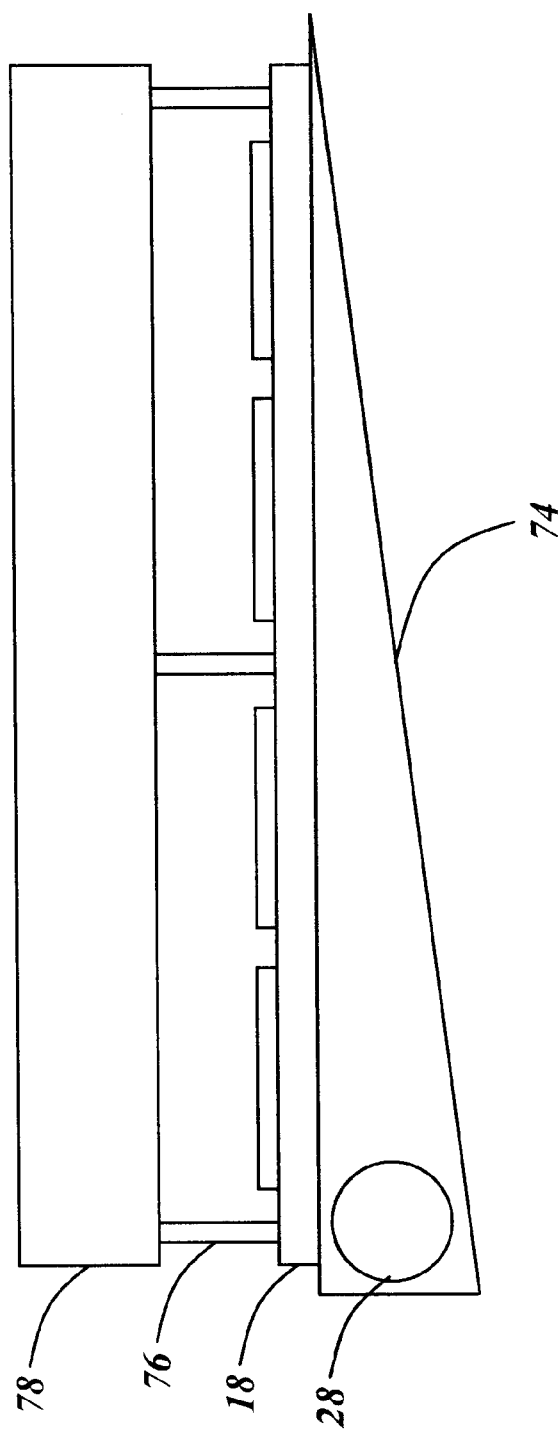
FIG. 11 is a cross-sectional side view of a thermal gradient curing system.

Referring to FIG. 11, a still further embodiment of a curing system incorporating a curing source 28 is a thermal gradient curing system 72. The thermal gradient system 72 includes a curing source 28, such as a heater, attached to one end of an elongate heating element 74 The heating element 74 may have constant dimensions along its longitudinal direction, or length, or, optionally, may have variable dimensions along its longitudinal direction. The placement of the curing source 28 at one end of the heating element 74 provides an exponential, linear, or other decay profile in the temperature of the element 74 as a function of distance from the curing source 28 resulting in a thermal gradient in the longitudinal direction. This heating element 74 is placed adjacent to the coated substrate 18, resulting in a variable temperature distribution across the coated substrate 18 and, therefore, variable curing conditions across the coated substrate 18. Additionally, posts 76 and a weight 78 may be placed above and in contact with the coated substrate 18, ensuring sufficient thermal communication between the coated substrate 18 and the heating element 74.

Figure 12:
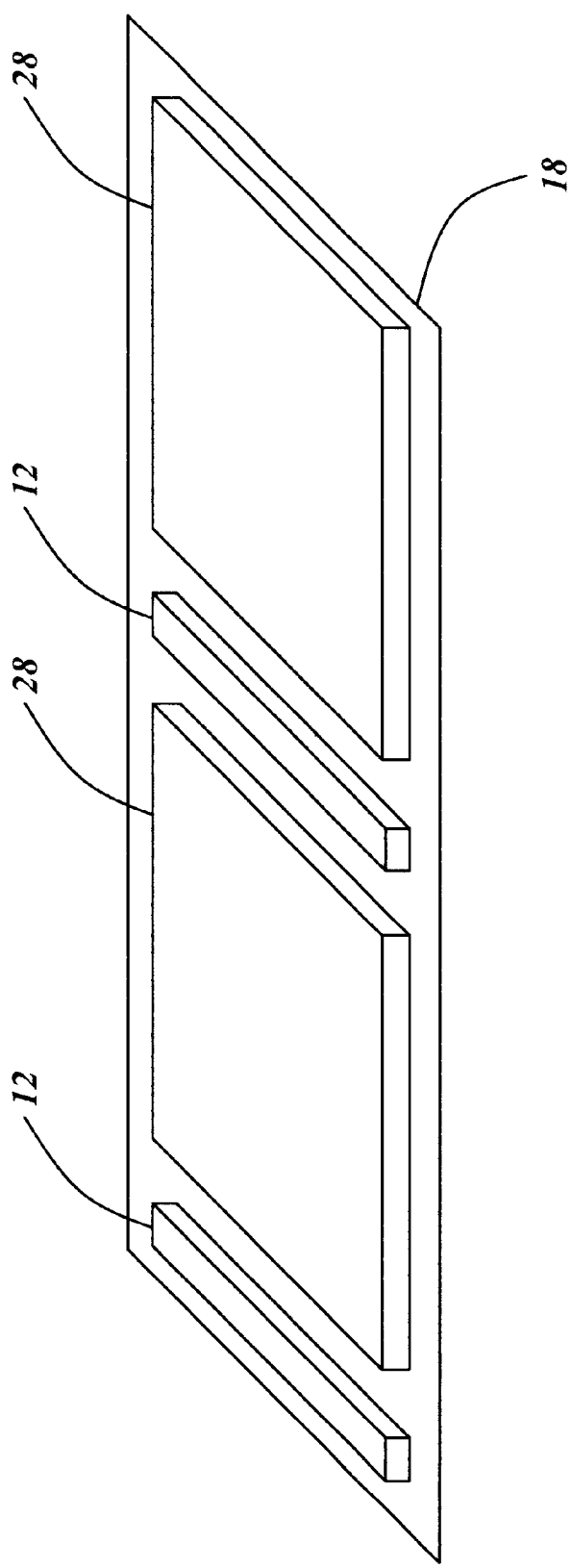
FIG. 12 is a perspective view of one embodiment of the system of FIG. 1, utilizing a plurality of coating and curing stations.
Figure 13:
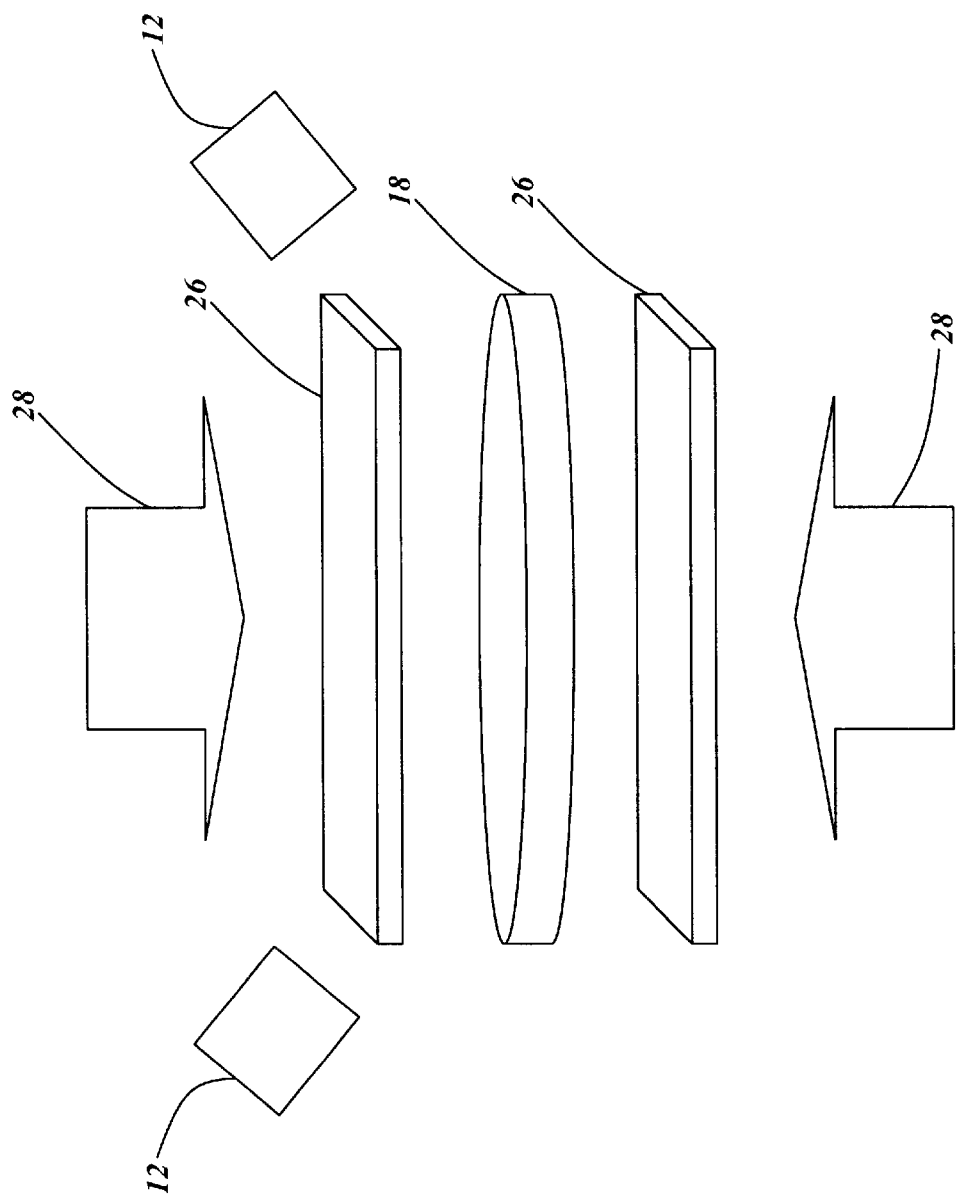
FIG. 13 is a perspective view of another embodiment of the system of FIG. 1, utilizing a plurality of spray coaters and curing sources.

Referring to FIGS. 12 and 13, various combinations of delivery mechanisms 12, or coating applicators, and curing sources 28 may be utilized to deposit and cure multi-layer coatings. Referring to FIG. 12, in one embodiment, the substrate 18 may be in the form of an elongated tape, web, or roll. A plurality of delivery mechanisms 12 or coating applicators may be placed adjacent to the moving substrate 18 at predetermined positions. Each delivery mechanism 12 or coating applicator may be associated with a curing station including one or more curing sources 28. Multi-layer coatings are produced as the substrate 18 moves through each of the coating/curing zones in series. Within each coating/curing zone, the substrate 18 preferably moves from a first position adjacent to a respective one of the plurality of delivery mechanisms 12 or coating applicators to a second position adjacent to a respective one of the plurality of curing stations. Referring to FIG. 13, in another embodiment, a plurality of delivery mechanisms 12, such as spray coaters, may be positioned above/below and adjacent to a stationary substrate 18. Spatial masks 26 may also be utilized to mask the surfaces of the substrate 18 from radiation or other curing mediums delivered by curing sources 28 positioned above/below the substrate 18. Multilayer coatings are produced as the plurality of materials, or combinations thereof, are delivered onto the substrate 18 at predetermined times and sequentially cured.

Each of the plurality of curing environments, discussed above, may include one of a plurality of curing sources 28 and one of a plurality of curing characteristics. Each of the plurality of curing stations may be operatively coupled to substantially the same or a substantially different curing source 28 and each of the plurality of curing stations may apply substantially the same or a substantially different selected one of the plurality of curing characteristics to each of the plurality of regions associated with a respective coating layer.

Figure 14:
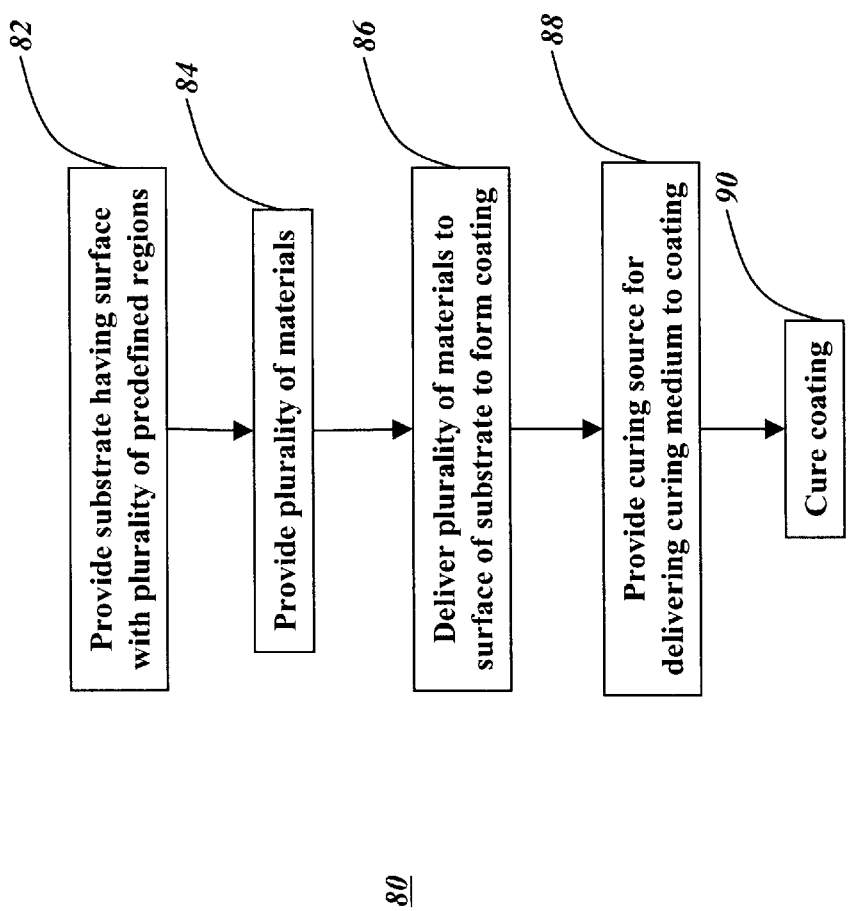
FIG. 14 is a block diagram of a method for the deposition and curing of coating compositions.

Referring to FIG. 14, a method 80 for making an array of coated materials that form a coating library 11 includes providing a substrate 18 having a surface 16 with a plurality of predefined regions 22 (Block 82). Optionally, the substrate 18 is movable. The method 80 also includes providing a plurality of materials 14 for coating the substrate 18 (Block 84). The method 80 further includes delivering the plurality of materials 14, or combinations thereof, to the surface 16 of the substrate 18 to form a predefined coating 20 on each of the plurality of predefined regions 22 of the substrate 18 (Block 86). The plurality of materials 14 are preferably delivered to the surface 16 of the substrate 18 in a vaporized/atomized or liquid state and the predefined coating 20 may, accordingly, be a thin film coating of at least one layer. The plurality of materials 14, or combinations thereof, may be delivered to the surface 16 of the substrate 18 using, for example, the spray nozzle or gun, the linear coating head, the spin-coating, and the dip-coating systems described above. The method 80 preferably includes providing a curing source 28 for delivering a curing medium to each of the plurality of predefined regions 22 of the coated substrate (Block 88) and curing each of the plurality of predefined regions 22 of the coated substrate 18 using a selected one of a plurality of curing environments (Block 90). The curing source 28 may, for example, include the spatially-addressable mask system, the scanning mirror system, the guided spatially-addressable curing system, and the thermal gradient curing system, described above. A plurality of delivery mechanisms 12 and a plurality of curing sources 28 may be utilized, forming a single or multi-layer coating. The selective combination of the plurality of materials 14 and the plurality of curing environments associated with each of the plurality of predefined regions 22 of the surface 16 of the substrate 18 form a combinatorial library.

It is apparent that there has been provided, in accordance with the present invention, a system and method for the fabrication of coating libraries. This invention permits the manufacture of coating libraries having virtually infinite variations in composition and curing environment. While the present invention has been particularly shown and described in conjunction with preferred embodiments thereof, it will be appreciated that variations and modifications may be effected by persons of ordinary skill in the art without departing from the spirit or scope of the invention. Further, it is to be understood that the principles related to delivery mechanisms and the curing of combinations of materials described herein apply in a similar manner, where applicable, to all embodiments.

In one working example, the effect of temperature on the UV curing of coatings was determined. In the past, fluorescent dyes have been used to monitor a variety of curing processes. Such environmentally sensitive dyes, however, have not typically been used to study temperature-induced effects in the UV curing of coatings as the fluorescence of such dyes exhibit temperature dependence. This investigation permitted the decoupling of temperature and radiation effects in the UV curing of coating formulations.

The studied coating formulation was an acrylated aliphatic urethane oligomer (Ebecryl 8804, UCB Chemicals Corp., North Augusta, S.C.). The fluorophore used was 4,4'-bis(2-benzoxazolyl)-stilbene (Aldrich Chemical Company, Inc., Milwaukee, Wis.). The fluorophore was incorporated into the uncured coating formulation by dissolving it in chloroform and mixing the solution with a 30% wt. solution of the acrylated aliphatic urethane oligomer in methoxypropanol. About 10 $\mu$l of the resulting solution was disposed within standard aluminum plates (5-mm diameter, 1-mm depth) used in differential scanning calorimetry instruments. The solvents were allowed to evaporate, keeping the solutions at room temperature for about 20 hours. The resulting coating had a uniform thickness. The concentration of the fluorophore in the final formulation was about $10^{31\ 4}$ M.

Seven samples with coating formulations were arranged on a gradient heater. The curing temperature of each sample is shown in Table 1.

TABLE 1

Curing Temperatures of Coating Samples

| Sample Position | Curing Temperature (degrees C.) |
| --- | --- |
| 1 | 26 |
| 2 | 42 |
| 3 | 56 |
| 4 | 70 |
| 5 | 85 |
| 6 | 100 |
| 7 | 115 |

Figure 15:
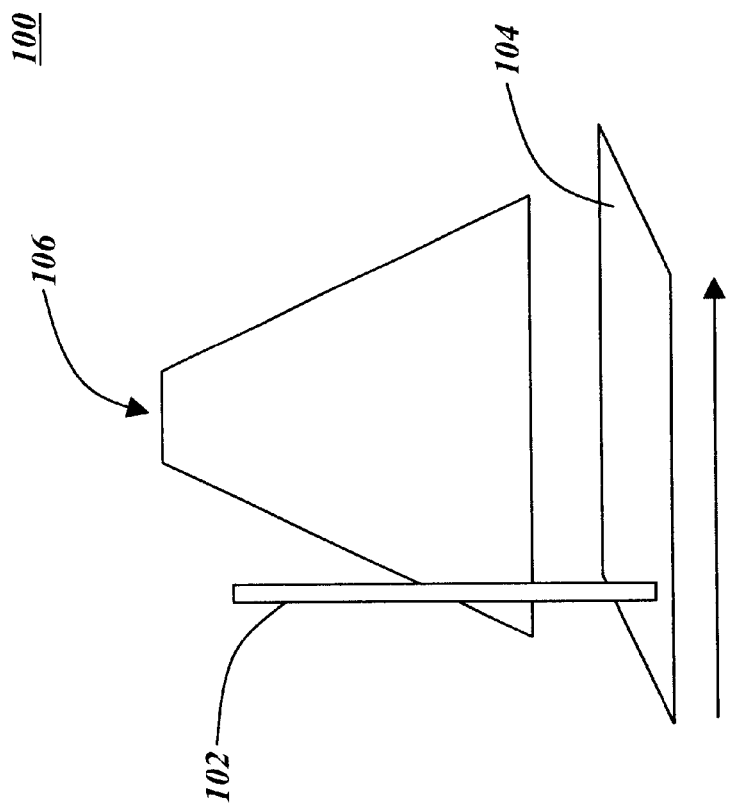
FIG. 15 is a schematic diagram of an experimental setup for the determination of the effect of temperature on the UV curing of coatings.

FIG. 15 is a schematic diagram of the experimental setup 100 for the determination of the effect of temperature on the UV curing of coatings. Fluorescence measurements were carried out using a nitrogen laser and a portable spectrofluorometer. The laser (emission wavelength 337.1 nm) was operated with a 20-Hz repetition rate with a maximum average power of about 50 mW, maximum energy per pulse of about 2.8 mJ and pulse width of about 800 ps. The spectrofluorometer (Model ST2000, Ocean Optics, Inc., Dunedin, Fla.) was equipped with a 200-$\mu$m slit, 600-grooves/mm grating blazed at 400 nm and covering the spectral range from about 250 nm to about 800 nm with efficiency greater than 30%, and a linear CCD-array detector. Light from the laser was nto one arm of a "six-around-one" bifurcated fiber-optic reflection probe 102 (Model R400-7-UV/VIS, Ocean Optics, Inc.). Emission light from the sample array 104 was collected when the common end of the fiber-optic probe 102 was positioned near a sample about a 45-degree angle to the normal to the surface. The second arm of the probe 102 was coupled to a spectrometer. Excitation light was blocked from entering the spectrotmeter using a long-pass optical filter. The common end of the fiber-optic probe 102 was arranged on an X-Y translation stage and data acquisition was achieved with a computer using a program written in LabVIEW (National Instruments, Austin, Tex.). The program provided adequate control of the data acquisition parameters and real-time communication with the translation stage. Processing of the collected spectra was performed using KaleidaGraph (Synergy Software, Reading, Pa.) and Matlab (The Mathworks, Inc., Natick, Mass.). For the evaluation of curing conditions, an intensity ratio at two wavelengths of the fluorescence emission spectra of the fluorophore (432 nm and 488 nm) as calculated as the $I_{488}/I_{432}$ ratio after a baseline subtraction.

Curing of the coating formulations was performed using a UV-visible Spot Cure System (Model Novacure, EFOS, Mississauga, ON, CAN). The system was equipped with a high-pressure 100-W Hg vapor short arc lamp. The light from the source 106 was coupled into an extended spectral range liquid-core optical waveguide (8-mm diameter, 1-m length) and a 10-cm long fiber-optic line spreader, which converted the round light beam propagating in the waveguide into a 10-cm long, 2-mm wide light line. Curing was accomplished in the air by periodic exposure of the coatings to the UV-visible radiation for about 60 sec every 200 sec. Illumination was performed by positioning the fiber-optic line spreader at about a 45-degree angle to the surface of the coatings at a distance of about 5 mm. Four replicate measurements of fluorescence spectra were performed between pulses of curing radiation.

The curing rate of the coating samples was found to have a strong temperature dependence and, at an advanced phase of the curing experiment, the formulations exhibited different degrees of curing which were proportional to formulation temperature. An additional curing mechanism was found to be present at curing temperatures above about 70 degrees C.

It is apparent that there has been provided, in accordance with the present invention, a system and method for the fabrication of coating libraries. This invention permits the manufacture of coating libraries having virtually infinite variations in composition and curing environment. While the present invention has been particularly shown and described in conjunction with preferred embodiments and examples thereof, it will be appreciated that variations and modifications may be effected by persons of ordinary skill in the art without departing from the spirit or scope of the invention. Further, it is to be understood that the principles related to delivery mechanisms and the curing of combinations of materials described herein apply in a similar manner, where applicable, to all embodiments.

What is claimed is:

1. A system for creating a combinatorial coating library, comprising:
   a coating system operatively coupled to at least one of a plurality of materials suitable for forming at least one coating layer on a surface of one or more substrates;
   a curing system operative to apply at least one of a plurality of curing environments to each of a plurality of regions associated with the at least one coating layer, the curing system comprising a plurality of waveguides each having a first end corresponding to at least one of the plurality of regions and a second end associated with at least one curing source, wherein each of the plurality of waveguides comprise a waveguide selected from the group consisting of a hollow tube, a metal rod, a quartz waveguide, a liquid-core waveguide, an optical fiber, and a transmissive element; and
   wherein the combinatorial coating library comprises a predetermined combination of at least one of the plurality of materials and at least one of the plurality of curing environments associated with each of the plurality of regions.

2. The system of claim 1, wherein the plurality of curing environments comprise a curing environment selected from the group consisting of thermal radiation, ultraviolet radiation, visible radiation, microwave radiation, electron beam radiation, laser radiation, and humidity.

3. The system of claim 1, wherein the curing system is operable to apply substantially the same predetermined one of the plurality of curing environments to each of the plurality of regions associated with the at least one coating layer of the one or more substrates.

4. The system of claim 1, wherein the curing system is operable to apply a substantially different predetermined one of the plurality of curing environments to each of the plurality of regions associated with the at least one coating layer of the one or more substrates.

5. The system of claim 1, wherein the plurality of materials comprise a material selected from the group consisting of a polymeric material, an oligomeric material, and a small molecule material.

6. The system of claim 1, wherein the coating system comprises a coating system selected from the group consisting of a spray/vapor coating system, a spin coating system, a dip coating system, a flow coating system, and a draw-down coating system.

7. A system for creating a combinatorial coating library, comprising:
   a coating system operatively coupled to at least one of a plurality of materials suitable for forming at least one coating layer on a surface of one or more substrates;
   a curing system operative to apply at least one of a plurality of curing environments to each of a plurality of regions associated with the at least one coating layer, wherein the plurality of curing environments comprise a curing environment selected from the group consisting of thermal radiation, ultraviolet radiation, visible radiation, microwave radiation, electron beam radiation, laser radiation, and humidity, the curing system comprising a plurality of waveguides each having a first end corresponding to at least one of the plurality of regions and a second end associated with at least one curing source, wherein each of the plurality of waveguides comprise a waveguide selected from the group consisting of a hollow tube, a metal rod, a quartz waveguide, a liquid-core waveguide, an optical fiber, and a transmissive element; and
   wherein the combinatorial coating library comprises a predetermined combination of at least one of the plurality of materials and at least one of the plurality of curing environments associated with each of the plurality of regions.

8. The system of claim 7, wherein the curing system is operable to apply substantially the same predetermined one of the plurality of curing environments to each of the plurality of regions associated with the at least one coating layer of the one or more substrates.

9. The system of claim 7, wherein the curing system is operable to apply a substantially different predetermined one of the plurality of curing environments to each of the plurality of regions associated with the at least one coating layer of the one or more substrates.

10. The system of claim 7, wherein the plurality of materials comprise a material selected from the group consisting of a polymeric material, an oligomeric material, and a small molecule material.

11. The system of claim 7, wherein the coating system comprises a coating system selected from the group consisting of a spray/vapor coating system, a spin coating system, a dip coating system, a flow coating system, and a draw-down coating system.

* * * * *

UNITED STATES PATENT AND TRADEMARK OFFICE
CERTIFICATE OF CORRECTION

PATENT NO. : 6,544,334 B1
DATED : April 8, 2003
INVENTOR(S) : Radislav Alexandrovich Potyrailo et al.

It is certified that error appears in the above-identified patent and that said Letters Patent is hereby corrected as shown below:

Title page,
Item [73], Assignee, cancel "General Electric Company, Schenectady, NY (US)" and substitute -- General Electric Company, Schenectady, NY (US) and Avery Dennison Corporation, Pasadena, CA (US). --

Signed and Sealed this

Twenty-first Day of September, 2004

JON W. DUDAS
*Director of the United States Patent and Trademark Office*